Dec. 6, 1927.　　　　　　　　　　　　1,652,126
F. HALLAR ET AL
LICENSE PLATE HOLDER
Filed June 22, 1926
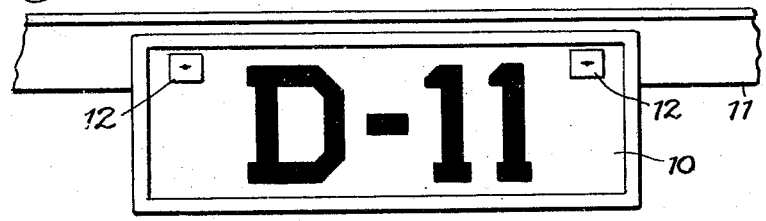
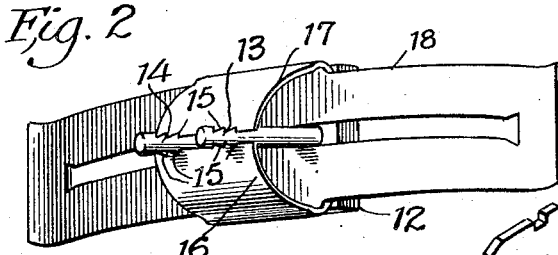
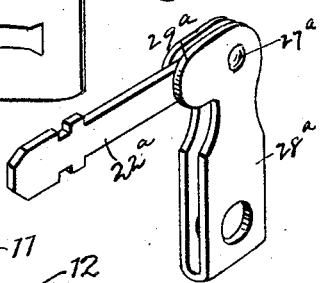
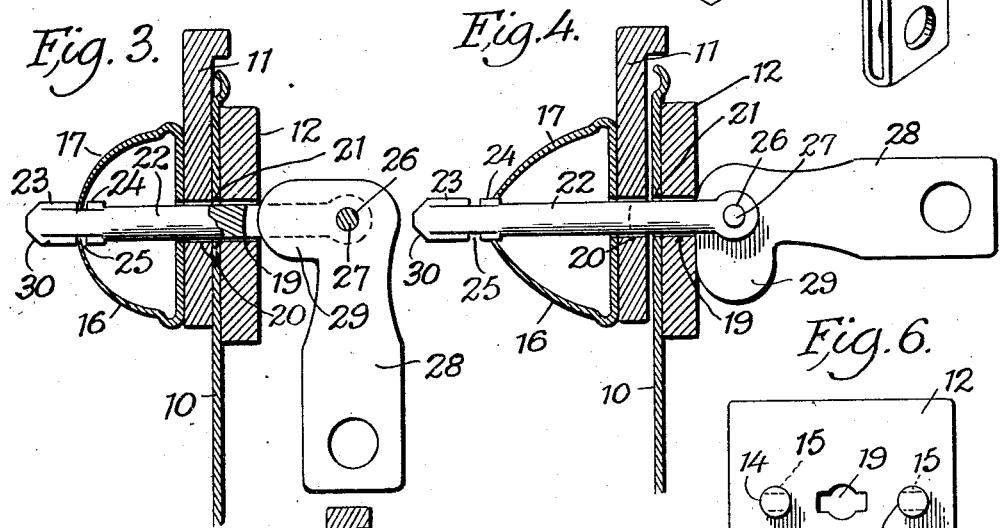

Patented Dec. 6, 1927.

1,652,126

UNITED STATES PATENT OFFICE.

FORREST HALLAR, OF BLAIRSTOWN, MISSOURI, AND BERYL C. LONG, OF TOPEKA, KANSAS.

LICENSE-PLATE HOLDER.

Application filed June 22, 1926. Serial No. 117,799.

This invention relates to brackets or clamps for securing license plates or tags to automobiles, and has for an object the provision of novel means for securely fastening license plates to brackets, the said device including means by which the fastenings may be disconnected for releasing the license plate to permit its removal, and therefore, the invention is capable of use from year to year in connection with the yearly renewed license plates.

It is a further object of this invention to provide novel means whereby a tension is exerted on the operating parts of the holder to prevent rattling, and the said device is capable of adjustment to take up lost motion, should it develop.

It is a still further object of this invention to provide a device in which the license plate holder cannot be readily manipulated by unauthorized persons who might want to remove a license plate, and it therefore acts as a safeguard, as well as a holding device.

It is a still further object of this invention to produce a plate holder of the character indicated which will be efficient and satisfactory in use, and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation, showing a license plate associated with a device embodying the invention;

Figure 2 illustrates a perspective view of the license plate clamping and retaining means;

Figure 3 illustrates a sectional view on the line 2—2 of Fig. 1 with the key in place;

Figure 4 illustrates a similar view with the key in a different position;

Figure 5 illustrates a similar view showing the key when inserted;

Figure 6 illustrates a detailed view of the post plate; and

Figure 7 illustrates a perspective view showing the key and the lever of simplified construction.

In the present embodiment of the invention, the license plate 10 is shown as attached to a conventional type of bracket 11, the plate being located against the bracket and the clamping plate 12 being located against the outer face of the license plate.

Each clamping plate is provided with two posts 13 and 14 having serrations or teeth such as 15, and these posts are adapted to be engaged by arcuate spring jaws 16 and 17, said jaws extending from the central portion of the edges of a spring 18 and converging to locate the ends of the jaws opposite the longitudinal center of the bowed spring 18, the arcuate and converging jaws each diminishing gradually in thickness from their points of engagement with the sides of the spring 18, to their adjacent edges terminating in spaced relation to each other to produce a clearance between them as shown by Figs 2, 3, 4, and 5 of the drawings and between which the posts are slidable, it being the intention of the inventors that the posts shall be engaged by the jaws when proper adjustment of the parts has been attained. The jaws are preferably formed integral with the edges of a bow spring 18, although, of course, they may be separate elements and they may be secured to the spring in any appropriate way. The curved ends of the spring in use bear against some permanent part of the bracket and preferably against the rear surface thereof, whereas the clamping plate, as stated, will bear against the face of the license plate. It is, of course, possible to reverse this relation of parts, but in order that the holder may be properly manipulated, the arrangement just described is the preferred arrangement.

An aperture 19 is provided in the plate 12 and it is intended to register with the usual openings or slots 20 that are formed in license plate brackets of the usual kind, and the license plate has an aperture or slot 21 which is in alinement with the aperture 19 and the opening 20. A seating device or key is employed in connection with the elements just described, and in the present embodiment thereof, it comprises a bar or plate 22 with ribs or flanges 23 and 24 on its two edges and they are spaced apart to form clearances or seats 25 that receive the edges of the arcuate jaws 16 and 17, under certain conditions of the manipulation. The key is slotted at its outer end, and on each side of the slot the key is provided with apertures such as 26, in which a pin 27 is held and on which a lever 28 is pivoted. The lever has a cam 29 which will engage the face of the plate 12 as the lever is manipulated and it will serve to exert a pull on the spring 18 through the engagement of the jaws with the key, as heretofore described, and as the jaws are thus pulled inwardly with respect to the posts 13 and 14, the jaws will ride over the ratchet teeth of the posts while the spring is being compressed. When proper tension has been applied to the spring, a forty-five degree rotation will be imparted to the key and the flanges or ribs will then extend parallel to the edges of the jaws and the key can be removed, leaving the jaws engaging the plates and holding the spring compressed. After the parts have been thus secured, the key can be used for the holder on the opposite end of the license plate.

It will be noted, as illustrated by Figure 2 of the drawings, that the bowed or curved spring 18 has therethrough a centrally and longitudinally extending slot and that beyond the slot or opening the ends of the spring are bent or curved transversely to provide rounded surfaces for contact with the rear side of the bracket. The arcuate bolt engaging jaws when under strain will have a tendency to twist or flex the portions of the slotted bow spring, so that by the construction shown, the resiliency of both the bow spring and the integral arcuate bolt engaging members is utilized without distorting the curved end portions of said bow spring.

The end of the key has camming surfaces 30 which serve to spread the jaws when the key is pushed between them, and this spreading of the jaws will cause their disengagement from the posts and the release of the clamping plate in order that it may be withdrawn when a license plate is to be removed.

In assembling the parts, the plate 12 having stud bolts or posts 13 and 14 with ratchet teeth 15 thereon is passed through registering apertures through a license plate and bracket and the bow spring 18, so that the bolts spread apart and pass between the jaws of the arcuate members which engage with the teeth of the bolts and thus establish an initial engagement of the parts. After such initial engagement or assembly of the parts, the bar 22 is passed through the key-hole located between the posts 13 and 14 of the plate 12, and through the apertures in the license plate, the bracket, the slot of the bowed spring 18 and jaws of the arcuate spring members, the lever being in position so that projections or flanges 23 and 30 may pass the ends of the jaws 16 and 17 when a half turn is given to the lever 28. The cam face of this lever when properly moved exerts force against the face plate and by movement of the lever the parts will be drawn securely together and will be so held, preventing any rattling and rendering separation difficult without a proper key and lever operated in a reverse manner to separate the jaws 16 and 17.

The construction of the parts is such that the license plate may be suspended by a single clamping plate, as the two bolts are distanced or separated to prevent the license plate swinging, and if desired, the license plate may be secured in place by a centrally located fixture, or the plate holder may be held by a single fixture at one end.

In use, as there is a spring pressure, rattling of the connected parts will be avoided without resorting to washers and the like, and the two spaced bolts which ordinarily occupy a horizontal position in use hold the license plate against sagging, and by such construction a single clamp may be used either centrally or at one end to efficiently connect a license plate to a support and maintain the same to prevent movement and rattling.

As the function of the device and the parts thereof have been stated in connection with a description of the elements and their relation to other elements, a resumé of the operation is believed unnecessary for an understanding of the invention by one skilled in the art.

The key 22$^a$ shown in Fig. 7 is preferably formed by stamping a metal plate of proper gage to produce notches or recesses at its edge corresponding to the recesses 25, and the end of the key has camming surfaces which will serve to spread the jaws. The lever 28$^a$ has a cam 29$^a$ and it is oscillatably mounted on the stud 27$^a$ which may extend from the side of the key.

License plates for automobiles are usually provided adjacent to their upper edges and sides with slots to receive bolts for connecting the parts, and owing to vibration such connecting means are likely to work loose and such connecting means are also objectionable, as the plates may be readily removed by unauthorized persons.

The automobile license plate holder is applicable to the usual plates and brackets, and the bow springs and spring jaws prevent rattling and provide means whereby the pressure between the bracket and plate may be adjusted by the use of a key to which is pivotally attached a handle or lever having a cam.

We claim:

1. In a holder for license tags, a plate having a post, the said plate being adapted to bear against the face of the license plate the said post extending through the license plate and a support therefor, a yieldable element which bears against the said support, jaws on the said yieldable element for engagement with the post and removable and manually operated means for effecting clamping engagement of the jaws with the post.

2. In a license plate holder, a plate having an aperture therethrough, the said plate having posts which project therefrom and are adapted to extend through a license plate and a bracket therefor, a spring having an aperture through which the posts extend, converging arcuate jaws between which the posts are clamped, and manually insertable, rotative and removable means for engaging the jaws to compress the spring, said means also being operative to spread the jaws to release the posts.

3. In combination with a supporting bracket and a license plate having registering openings therethrough, of means for connecting the license plate to the bracket comprising a pair of longitudinally curved plates each having separable arcuate jaws which are integral with the side edges of the curved plates, face plates having notched bolts which are adapted to be engaged by the jaws and when so engaged to hold the license plate in engagement with the bracket and removable manually operated means for exerting pressure upon the parts when associated.

4. A license plate holder comprising a member having parallel posts which extend therefrom, resilient means for engagement with the posts, a key receiving opening through said member located between the posts for the passage of a key for simultaneous engagement with the post engaging means.

5. A license plate holder comprising a license plate having openings adjacent to the corners thereof, a bracket having registering openings therethrough, a plate provided with spaced posts having notched end portions, an opening through the plate between the posts, a spring having an opening therethrough and arcuate members for engagement with the posts, and removable means insertable through the registering openings for separating the arcuate members to move the same out of engagement with the posts.

6. In combination with a license plate and a bracket, each having registering openings therethrough, a longitudinally curved spring having a slot therethrough and arcuate members which are integral with the spring and overlie the slot, a plate having posts spaced for passage through the registering openings, a key-hole through the plate located between the posts, and a key for engagement with each of the arcuate members.

7. In combination with a supporting bracket and license plate, of a plate having serrated posts and an opening between the posts, a resilient plate having a slot therethrough and curved side members for simultaneous engagement with the posts, a key for engagement with the curved side members, and means on the key for engagement with the plate for reciprocating the key and for turning the same.

8. In combination with a supporting bracket and license plate, of a fastening device which comprises a plate having posts with serrations thereon, the posts being alined and adapted to extend through openings formed in the bracket and the plate, a spring plate having a slot therethrough which is in alinement with the openings through the bracket and the plate, arcuate members on the spring plate, the edges thereof being adapted to engage with the serrations of the posts, a key-hole through the plate having the posts, a key which is adapted to be passed through the key-hole, the plate, bracket and the spring plate for engagement with the edges of the arcuate members between the posts, a handle pivoted to the shank of the key, and a cam on the handle for engagement with the plate and the arcuate members of the spring plate.

9. A license plate holder comprising a face plate having posts which extend therefrom, said posts having serrations adjacent to their ends, a license plate having openings therethrough for the passage of the posts, a support for the license plate, said support having therethrough openings which register with the openings through the license plate, a bowed spring having therethrough a slot, and having arcuate and converging jaws which are spaced to aline with the openings through the parts which are between the posts when the parts are associated, and means adapted to engage with the jaws to bend the same to exert a pulling force upon the posts.

10. A license plate holder for use with a support each having registering openings therethrough comprising a face plate having parallel posts with notches formed therein and a key receiving opening positioned between the posts, a bowed spring having on opposite sides converging arcuate jaws which diminish gradually in thickness from the side edges of the bowed spring to their contiguous edges and an opening through the bowed spring in line with the openings through the face plate, the license plate, the support, and the contiguous edges of the jaws.

11. A holder for license tags comprising a face plate, a pair of posts which project from the face plate, an opening through the face plate located between the posts, a license tag, a bracket, the tag and the bracket each having openings therethrough for the passage of the posts and openings which register with the opening through the face plate, a longitudinally slotted bowed spring having curved ends for engagement with the bracket, arcuate jaws which extend from an intermediate portion of the bowed spring, the post engaging ends of the arcuate jaws being in alinement with the opening through the face plate and with the openings through the license tag, the bracket and the bowed spring when the parts are positioned for use.

FORREST HALLAR.
BERYL C. LONG.